Figure 16:
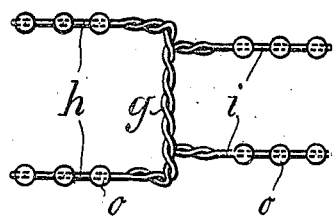
Figure 18:
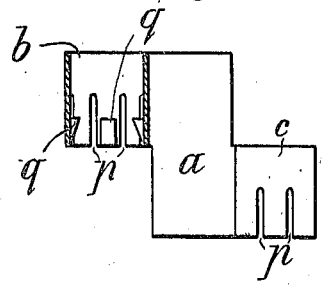
Figure 17:
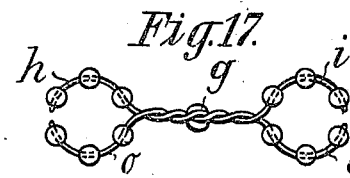
Figure 19:
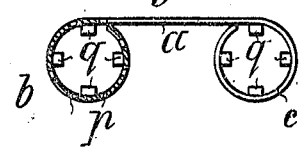
Figure 20:
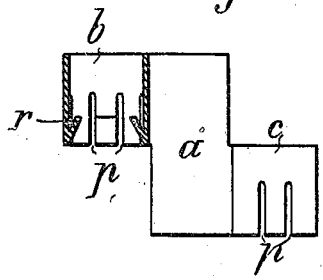

No. 891,374. PATENTED JUNE 23, 1908.
F. RUSZITSZKA.
CARTRIDGE FEEDING DEVICE FOR MACHINE GUNS OR THE LIKE.
APPLICATION FILED OCT. 3, 1907.
6 SHEETS—SHEET 1.
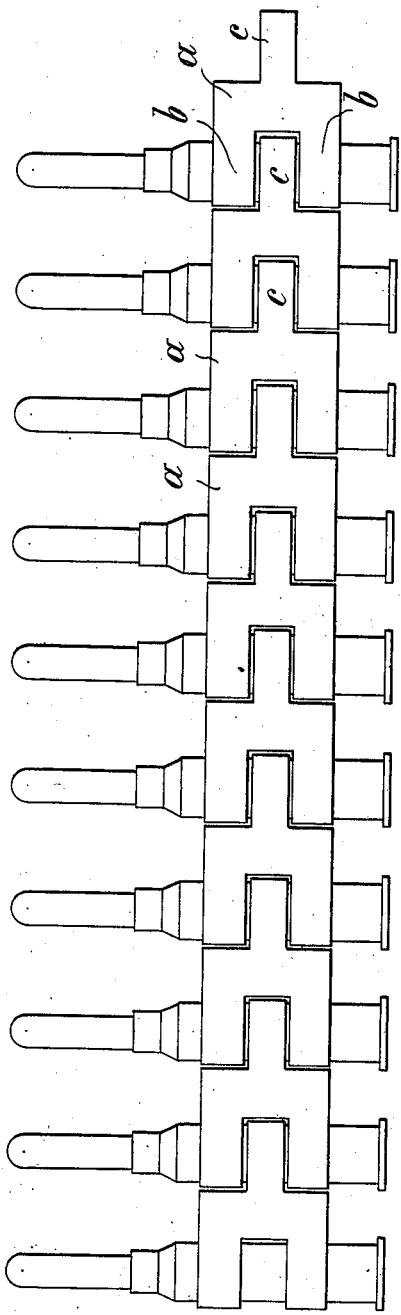
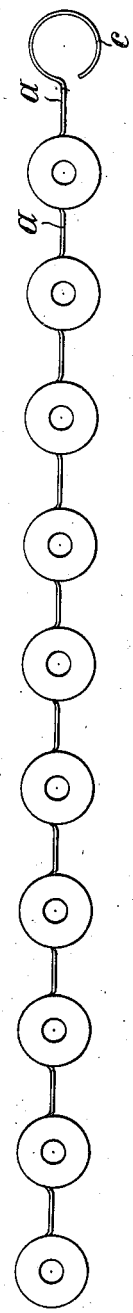
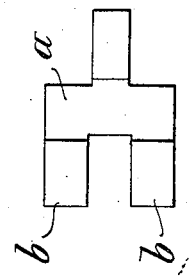
Witnesses. Inventor.

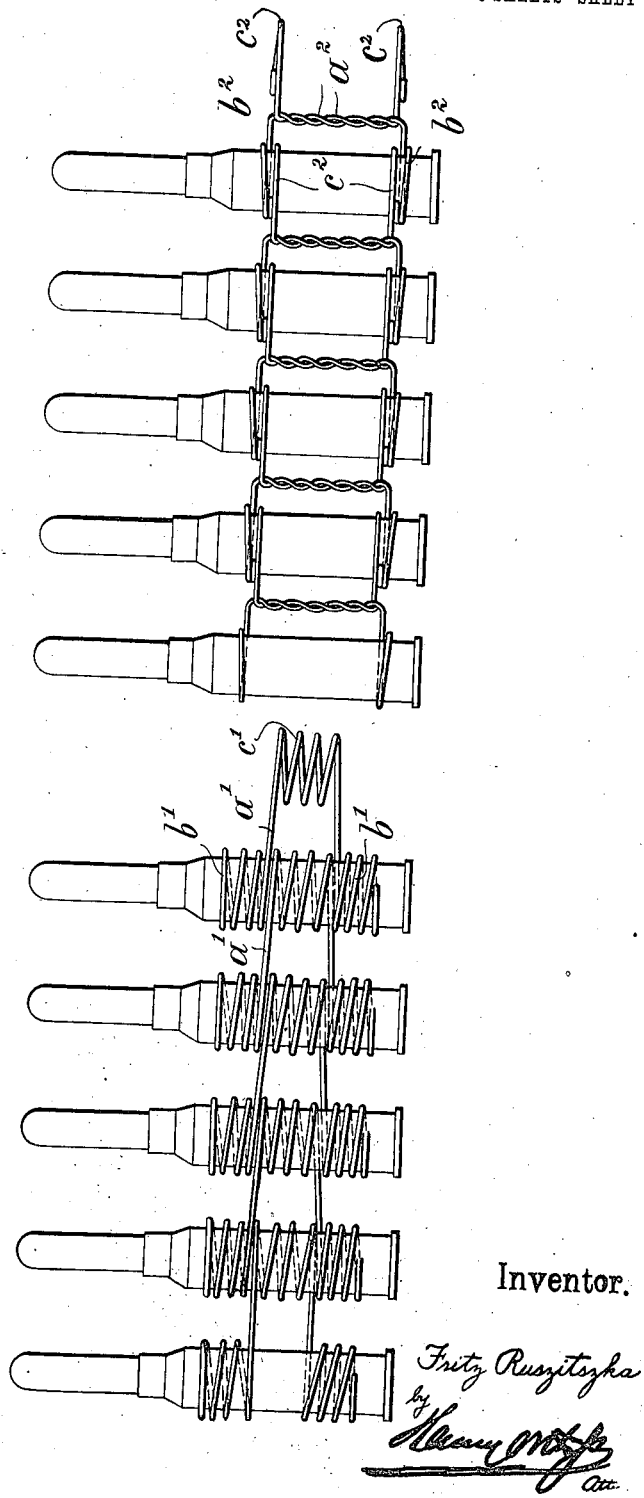

No. 891,374. PATENTED JUNE 23, 1908.
F. RUSZITSZKA.
CARTRIDGE FEEDING DEVICE FOR MACHINE GUNS OR THE LIKE.
APPLICATION FILED OCT. 3, 1907.
6 SHEETS—SHEET 3.
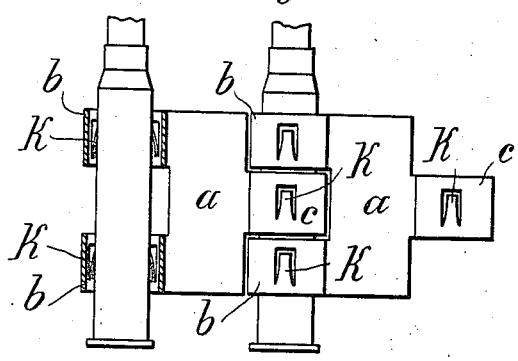
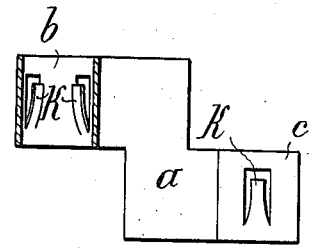
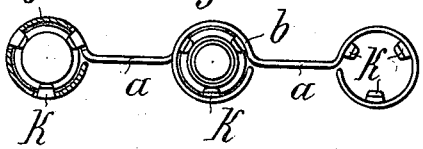
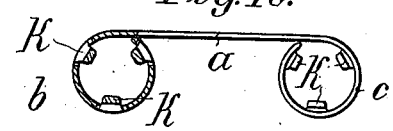
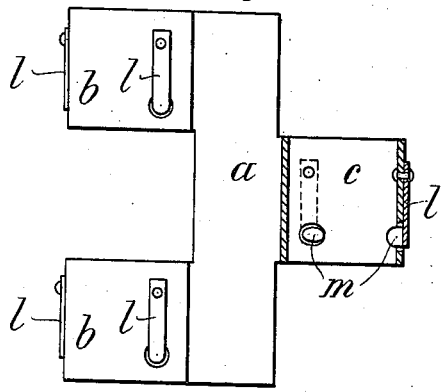
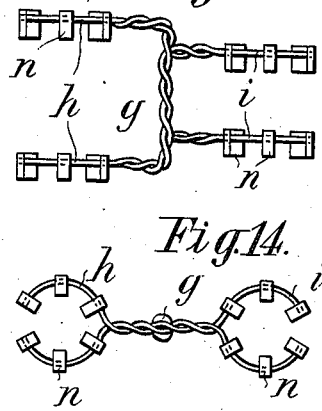
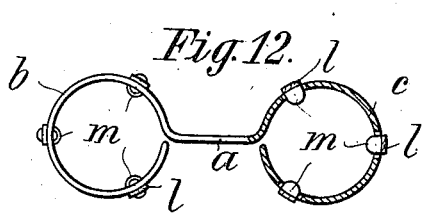
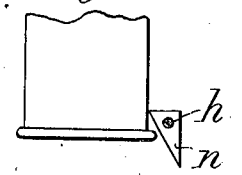
Witnesses.
Jesse N. Lutton
B. Mommers
Inventor.
Fritz Ruszitszka
by
Atty.

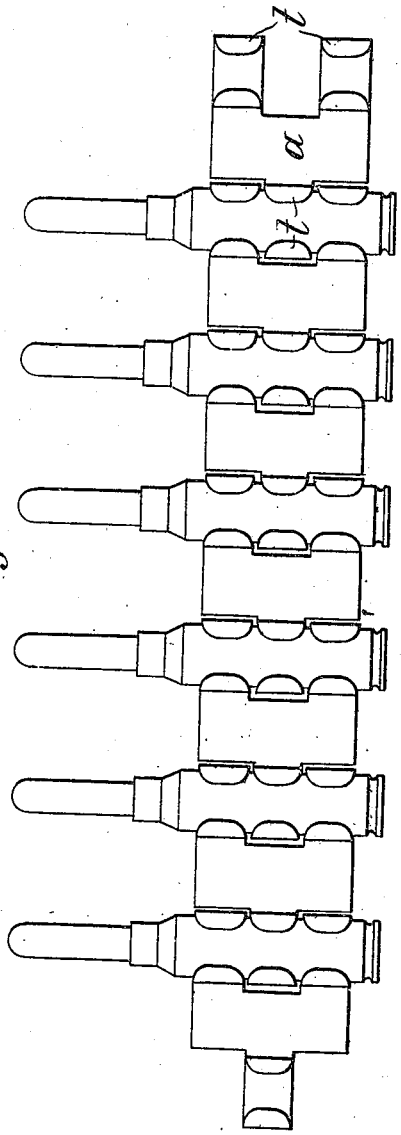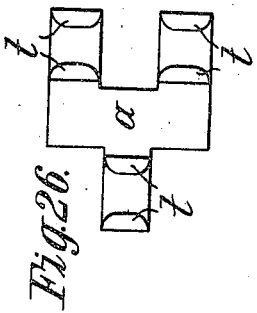

No. 891,374. PATENTED JUNE 23, 1908.
F. RUSZITSZKA.
CARTRIDGE FEEDING DEVICE FOR MACHINE GUNS OR THE LIKE.
APPLICATION FILED OCT. 3, 1907.
6 SHEETS—SHEET 6.
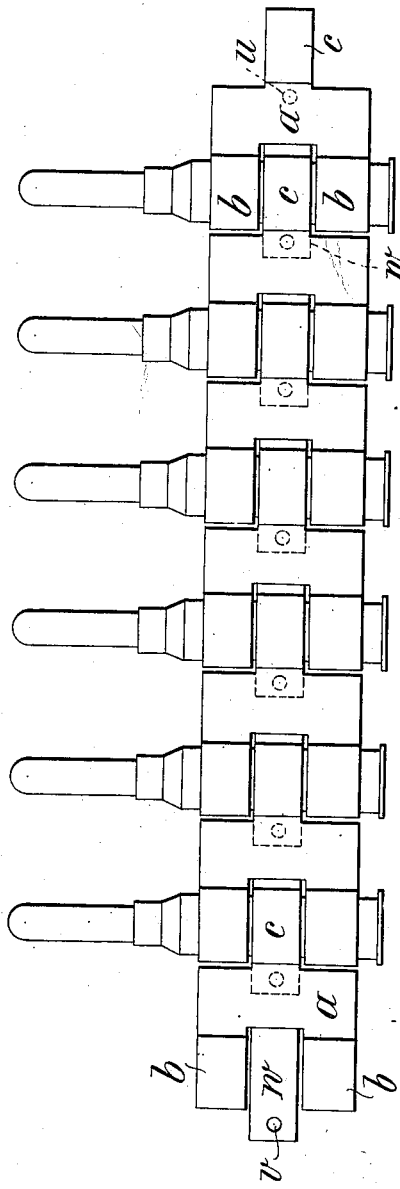
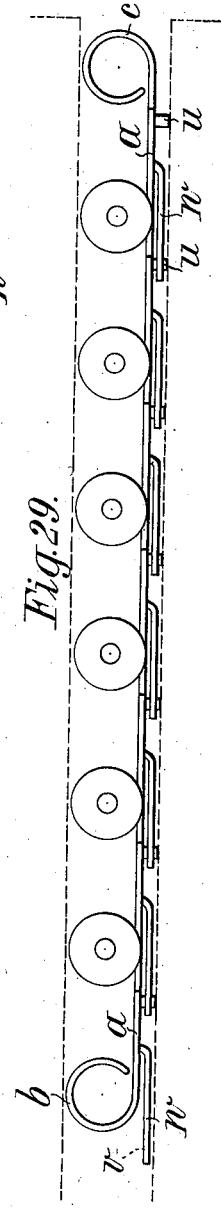
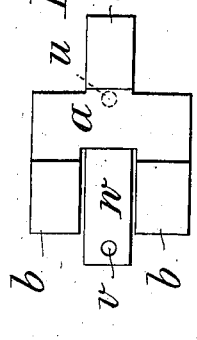
Witnesses.
Jesse N. Lutton.
ADommers
Inventor.
Fritz Ruszitszka
by
Atty.

UNITED STATES PATENT OFFICE.

FRIEDRICH RUSZITSZKA, OF WELS, AUSTRIA-HUNGARY, ASSIGNOR TO THE FIRM OF ANTON KELLER, METALLWERKE UND MUNITIONSFABRIK, ENZESFELD, N. OST, OF ENZESFELD, AUSTRIA-HUNGARY.

CARTRIDGE-FEEDING DEVICE FOR MACHINE-GUNS OR THE LIKE.

No. 891,374.

Specification of Letters Patent.

Patented June 23, 1908.

Application filed October 3, 1907. Serial No. 395,786.

*To all whom it may concern:*

Be it known that I, FRIEDRICH RUSZITSZKA, subject of the Emperor of Austria-Hungary, residing at Wels, in Upper Austria, Austria-Hungary, have invented certain new and useful Improvements in Cartridge-Feeding Devices for Machine-Guns or the Like, of which the following is a specification.

For introducing the cartridges into the carrying devices of machine guns or the like, frames, similar to the magazines in hand-fired weapons, or cartridge bands or belts made of hemp or like material have hitherto been commonly used.

The frames are disadvantageous in that they can only hold comparatively few cartridges and do not permit of an automatic feed of the ammunition from its container to the carrying device; thus they have to be fed by hand, which delays the firing and wastes time.

When cartridge belts or bands are used, it is possible after placing the belt in the breech of the weapon to feed the cartridges automatically; however, even in this case the number of shots which can be fired without interruption is limited, since a fresh belt must be substituted for the spent one each time by hand. Moreover, such belts frequently go wrong in working, for instance when it rains, since they become saturated with water and then lose their pliability if exposed to frost. Also it is necessary when changing the belts to pull through that part of the belt which protrudes on the side of the carrying device opposite to the charging slot and of which the cartridges have already been fired, so that the substitution of a new belt takes up time.

The present invention relates to a cartridge feeding apparatus, which avoids the above mentioned disadvantages and in using which, break-downs due to weather cannot occur, while the automatic firing can continue uninterruptedly for a long time and the unloading can be done quickly and without removing parts of the carrying device.

According to the invention, separate chain links, preferably made of metal and carrying one or more cartridges, are arranged one behind the other to form a chain like a band; these chain links after passing through the feeding device, that is when they no longer contain cartridges, are disconnected each separately from the chain, two adjacent links being connected either by the cartridges themselves or by independent devices on the links themselves and in the first case the connection is released by the removal of the cartridge which is performed by the weapon itself and in the second case it is released automatically by some special means fixed to the breech.

In the accompanying drawings several forms of the cartridge feeding apparatus are shown, in which the cartridges themselves form the connection between the chain links.

Figures 1 and 2 show plan and front elevation respectively of a chain for a machine gun of any pattern, the feeding device of which pulls the cartridges out of the chain backwards. Figs. 3 and 4 show in plan and front elevation respectively a single chain link. Figs. 5 and 6 show in plan other forms of chains of this sort. Figs. 7 and 8, 9 and 10, 11 and 12, 13, 14 and 15, 16 and 17, 18 and 19, 20 and 21, 22 and 23 show in plan and front elevation, partly in section, various forms of chain links of such feeding devices for flanged cartridges, in which the ejection of the latter from the chain is forwards. Figs. 24, 25, 26, & 27 show in a plan and in front elevation a chain and a separate link of the chain for that kind of machine guns in which the cartridges are pushed out of their annular holders in a forward direction by the engagement of the bottom of the cartridge case with the forward moving breech block. Figs. 28, 29, 30 & 31 show in like views a chain and single link thereof for a machine gun or the like in which the forwarding device engages the chain during the feeding of the latter at the part of the chain which has already run out and has been emptied of its cartridges.

In the form shown in Figs. 1–4 each chain link *a* consists of a middle piece which has on one of its longitudinal sides two co-axial rings *b* separated by a space and on the other longitudinal side a third ring *c* opposite this space, the width of which is the same as the width of this space. These rings serve to receive the cartridges and are formed to correspond with the cases thereof. In order to secure a safe hold of the cartridges on the chain without influencing its flexibility the rings *b* are exactly turned to fit the cartridges and are then split along their length to give them spring, while on the other hand the ring c between the rings b is made of slightly larger diameter than that of the cartridges.

To form a chain two links a are placed together so that the ring c of one link comes between the rings b of the other link and all three rings are co-axial, the cartridge is then passed through the three rings and in this way the two links are flexibly connected together as if with a hinge pin. For loading the cartridge chain thus formed is placed in the same way as a belt, with one end in the charging slot of the weapon. On firing, after extraction of each cartridge from the chain, a link of the latter falls off and is thrown out by the kick of the cartridge produced by the feeding device so that on withdrawing a chain not completely used, there is nothing to draw through the feeding device. An arrangement such as this allows of the chain being lengthened during firing, by simply coupling on more links, so that the automatic firing can continue without interruption for as long as desired.

In machine guns where the feeding device ejects the cartridge cases from the chain forwards, the rings of the chain links are made like forked springs and when using flanged cartridges, the rear edges of the rings are made funnel-shaped to allow the flange of the cartridge to pass.

The chain links may be made of wire, instead of tin-plate. In Fig. 5 a cartridge chain is shown in which the links consist of pieces of wire $a'$, the ends and middle parts of which are formed in helices $b'$, $b'$ and $c'$ which have the same relative positions as the rings $b$, $b$ and $c$ and hold the cartridges in the same manner. In Fig. 6 a cartridge chain is shown, the links of which consist of two pieces of wire $a^2$ jointed together at the middle, the ends of which are shaped to rings $b^2$, $b^2$ and $c^2$, $c^2$, of which the rings $b^2$ are slightly farther apart than the rings $c^2$, so that in forming a chain the rings $c^2$ of one link pass between the rings $b^2$ of another link and the cartridge can then be passed through all four rings. The rings $b^2$ and $c^2$ could be similarly formed when the links are made of one piece of wire only. All the various chain links shown can of course be connected together by removable pins or the like, in which case each link is provided with one or more rings, clips etc. for holding the cartridges. The release of the connection is made on firing by a withdrawing or expelling mechanism attached to the feeding device of the weapon which removes after the firing of each cartridge the corresponding connecting pin from its rings by pushing it out either forwards or backwards.

For flanged cartridges, which are ejected forwards, the rings $b$ and $c$, when the link $a$ is made of tin-plate, as in Figs. 7 and 8, 9 and 10, have a diameter large enough to allow the cartridge flange to pass through. But in order to hold the cartridges, the rings are provided with a number of projecting springs, preferably 3, at equal distances from each other, which project so far into the ring as to touch the cartridge case as can be seen in Figs. 7 and 8. These springs are either, as in Figs. 7, 8 and 9, 10 formed of projecting strips $k$ of the same material as the rings $b$, $c$ which strips remain attached to the ring at their rear, narrow ends which are turned towards the back end of the cartridge and are bent inwards, or they can be made of separate pieces of metal $l$, which are riveted to the outer surface of the rings $b$, $c$ and have at their ends which are turned towards the rear end of the cartridge a rounded projection $m$ extending through a hole in the ring and thereby holding the cartridge tight (Figs. 11 and 12), which form is of advantage in guns of large caliber for the larger cartridges. These springs $l$ $l$ are pressed outwards by the flange of the cartridge pressing on the spring or the projection $m$ as it is pressed forward by the feeding apparatus and so allows the cartridge to pass.

If the links of a cartridge chain are made of wire, then the rings closing on the sides of the cartridges are split open and so given a spring and have projections also, which are in contact with the surface of the cartridges and so hold them in their places, but which are pressed apart by the flange as the cartridge is pressed forward, so that the wire ring is enlarged enough to allow the flange to pass. These projections can have the form of pieces $n$ bounded by plane faces fixed on to the rings $h$, $i$ of the link $g$, the surfaces turned towards the cartridge case being sloped upwards (Figs. 13, 14 and 15); or they can have the form of small balls $o$ (Figs. 16 and 17) which are affixed to the wire rings and spaced apart like the pieces $n$.

Figure 22:
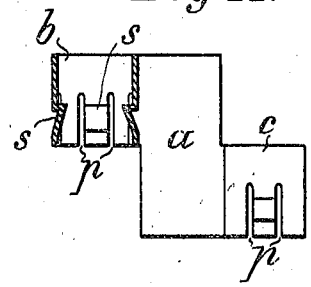
Figure 21:
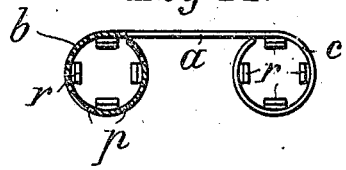
Figure 23:
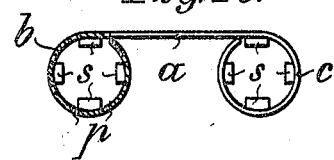

Chain links of tin-plate can be made by splitting the back half of the rings $b$, $c$ meant for the forward removal of rim cartridges. Between every two such slits $p$ (Figs. 18-23) inwardly extending projections are placed to keep the cartridge in position. These projections may be wedges $q$ (Figs. 18 and 19) which are soldered to the inside of the slit part of the ring or fixed in any other suitable way; by bending the back edge of each ring before rolling the latter and slitting these edges, inwardly projecting laps $r$ (Figs. 20 and 21) or angular indentations $s$ are formed in the slit edge (Figs. 22 and 23).

Each link made of tin-plate can be provided with three rings $b$, $b$ and $c$ (Figs. 3, 7 and 11) or there need only be one ring on each side $b$ or $c$ (Figs. 9, 18, 20, 22). In the first case if the flanged cartridges are to be ejected forwards, the middle ring, in the second case the rear ring, touches the surface of the cartridge only lightly, while the spring or spring projections of the other ring or rings grip the cartridge tightly. In this manner the cartridges are held tightly and the chain remains pliable.

For that kind of machine guns in which the cartridges are pushed out from their annular holds in a forward direction and viz., in such a manner that the breech action in moving forward engages a part of the bottom of the cartridge case that stands in its path and pushes the cartridge into the gun it is necessary to provide the holding rings of each chain link $a$ with a suitably wide gap extending from one end to the other or to substitute for the holding rings spring clamps $t$ which latter are arranged at such a distance from each other that the engagement of the edge of the bottom of the cartridge case by the breech block is rendered possible, as shown in Figs. 24 to 27.

The forms of execution of cartridge feeding described are obviously suitable for those kinds of machine guns and the like in which the feeding organ that produces the successive motion of the cartridge chain engages the chain at that part of the same which has not run out yet. The described forms of execution can however not be employed in connection with the kind of machine guns, the feeding device of which is so arranged as to engage the cartridge chain during the forward movement of the latter and that part of this chain which has already run out and is emptied of the cartridges, because the rigid connection of the links that have run out with the remaining parts of the chain is dissolved by the pulling out of the cartridges from their holding clamps and the like. It is therefore necessary to arrange the cartridge feeding device for the said kind of machine guns in such a manner that the disconnection of the individual links of the chain from the remaining integral part of the chain should take place during firing not in the very moment when the cartridge is withdrawn from these holding devices but only subsequently when the run out chain link has completely left the guiding channel of the gun. For this purpose the chain links are provided with suitable connecting means such as hooks or teeth and with corresponding perforations or other suitable means which are arranged in such a manner that the firm connection of the links with each other is established so long as the latter are in the guiding channel and is therefore in an inflexible condition being inclosed within the channel; when the chain links have issued through the outlet opening of the guiding channel they become once again flexible and are at once disconnected.

In the form of execution shown in Figs. 28 to 31 the links $a$ carrying the holding rings $b$, $b$, $c$ are provided with a tooth or lug $u$ and with a perforation $v$, the latter being preferably made in a separate projecting arm $w$ of the link $a$. When the links are put together the tooth of one link engages the perforation of the next link, whereby a rigid connection of the links is established so long as the chain remains in a stretched and unflexible condition. When therefore the gun is being fired the separate links remain firmly united with the remainder of the chain after the cartridges have been withdrawn until they arrive at the outlet opening of the guiding channel shown in Fig. 29 by dotted lines, that is to say until the chain regains its flexibility owing to the shaking of the chain during firing the issuing links are disconnected and fall off from the remaining part of the chain.

I claim.

1. A cartridge feeding device comprising a plurality of links having interfitting ends for the reception of a cartridge which latter forms a pintle for the assembled links.

2. A cartridge feeding device comprising a plurality of carrier links having interfitting cartridge receiving members on their ends.

3. A cartridge feeding device comprising a plurality of carrier links having cartridge retaining sockets on their ends in different relative positions said links adapted to be connected by a cartridge in the sockets.

4. A cartridge feeding device comprising a chain composed of links having resilient sockets on their ends in different relative positions said links adapted to be connected by a cartridge in the sockets.

5. A cartridge feeding device comprising a plurality of carrier links each having a socket on one end and a pair of co-axial sockets on the opposite end said links adapted to be connected by a cartridge in the sockets.

In testimony whereof I have hereunto set my hand in presence of two subscribing witnesses.

FRITZ RUSZITSZKA.

Witnesses:
GUSTAV PHILIPPITSCH,
ROBERT W. HEINGARTNER.